United States Patent
Velten et al.

(10) Patent No.: US 12,338,175 B2
(45) Date of Patent: *Jun. 24, 2025

(54) COMB POLYMERS AS BLOCKING ADDITIVES FOR SWELLING CLAYS

(71) Applicant: SIKA TECHNOLOGY AG, Baar (CH)

(72) Inventors: Ulf Velten, Baar (CH); Jürg Weidmann, Baar (CH); Lukas Frunz, Baar (CH); Patrick Juilland, Baar (CH)

(73) Assignee: SIKA TECHNOLOGY AG, Baar (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/435,416

(22) Filed: Feb. 7, 2024

(65) Prior Publication Data

US 2024/0246858 A1  Jul. 25, 2024

Related U.S. Application Data

(62) Division of application No. 17/275,248, filed as application No. PCT/EP2019/076515 on Oct. 1, 2019, now abandoned.

(30) Foreign Application Priority Data

Oct. 5, 2018 (EP) ..................... 18198883

(51) Int. Cl.
| | |
|---|---|
| C04B 24/26 | (2006.01) |
| C04B 14/10 | (2006.01) |
| C04B 28/02 | (2006.01) |
| C08F 290/14 | (2006.01) |
| C04B 103/00 | (2006.01) |
| C04B 103/30 | (2006.01) |
| C04B 111/32 | (2006.01) |

(52) U.S. Cl.
CPC ........ *C04B 24/2647* (2013.01); *C04B 14/104* (2013.01); *C04B 28/02* (2013.01); *C08F 290/142* (2013.01); *C04B 2103/006* (2013.01); *C04B 2103/30* (2013.01); *C04B 2111/32* (2013.01)

(58) Field of Classification Search
CPC ... C04B 24/2647; C04B 14/104; C04B 28/02; C04B 2103/006; C04B 2103/30; C04B 2111/32; C08F 290/142
See application file for complete search history.

(56) References Cited

U.S. PATENT DOCUMENTS

| | | |
|---|---|---|
| 4,471,100 A | 9/1984 | Tsubakimoto et al. |
| 6,582,510 B1 | 6/2003 | Schwartz |
| 2002/0121229 A1 | 9/2002 | Jardine et al. |
| 2002/0161267 A1 | 10/2002 | Itoh et al. |
| 2009/0312460 A1 | 12/2009 | Lorenz et al. |
| 2012/0208945 A1 | 8/2012 | Kuo et al. |
| 2014/0066547 A1 | 3/2014 | Schinabeck et al. |
| 2016/0017082 A1 | 1/2016 | Hampel et al. |
| 2018/0251401 A1 | 9/2018 | Takayama et al. |

FOREIGN PATENT DOCUMENTS

| | | |
|---|---|---|
| CN | 1673162 A | 9/2005 |
| EP | 2 463 317 A1 | 6/2012 |
| JP | 2012-050395 A | 3/2012 |
| WO | 2014/106572 A1 | 7/2014 |

OTHER PUBLICATIONS

Jan. 7, 2020 Search Report issued in International Patent Application No. PCT/EP2019/076515.
Jan. 7, 2020 Written Opinion issued in International Patent Application No. PCT/EP2019/076515.
English machine translation of JP 2012-050395A (Year: 2012).
Jun. 14, 2023 Office Action issued in U.S. Appl. No. 17/275,248.
Wang et al. Facile synthesis of well-defined water-soluble polymers via atom transfer radical polymerization in aqueous media at ambient temperature. Chem. Commun., 1999, 1817-1818. (Year: 1999).
Liu etal. Conformation-function relationships for the comb-shaped polymer pOEGMA. Progress in Polymer Science 48 (2015) 111-121. (Year: 2015).
Sep. 8, 2023 Office Action issued in U.S. Appl. No. 17/275,248.

*Primary Examiner* — John E Uselding
(74) *Attorney, Agent, or Firm* — Oliff PLC

(57) ABSTRACT

A method for inerting a swellable clay and/or for reducing or inhibiting adverse effects of swellable clays on the effectiveness of dispersants in mineral binder compositions, includes adding a comb polymer to a mineral binder composition. The comb polymer includes: at least one poly (alkylene oxide) side chain-bearing monomer unit without ionic groups, optionally at least one cationic monomer unit, optionally at least one anionic monomer unit, and optionally, at least one non-ionic monomer unit.

5 Claims, No Drawings

COMB POLYMERS AS BLOCKING ADDITIVES FOR SWELLING CLAYS

TECHNICAL FIELD

The invention relates to a comb polymer, in particular for use as a clay-inerting agent. Additionally, the invention is concerned with a kit of parts and a composition comprising the comb polymer. Further aspects of the invention are related to a method, in particular for plasticizing a mineral binder composition, as well as a use of a comb polymer as a clay-inerting agent.

BACKGROUND ART

Dispersants or superplasticizers are used in the building industry as plasticizers or water-reducing agents for mineral binder compositions, such as for example concrete, cement mortar, plaster or lime mortar. The dispersants are generally organic polymers which are added to the mixing water or admixed with the binder compositions in solid form. In this way, it is advantageously possible to alter both, the consistency of the binder composition during processing and the properties in the hardened state.

Known particularly effective dispersants are, for example, polymers based on polycarboxylate ethers (PCE). Polymers of this kind have a polymer backbone and side chains bonded thereto. Corresponding polymers are described, for example, in EP 1 138 697 A1 (Sika AG).

High quality river sands, which are typically used as aggregates for mortar or concrete production, are increasingly becoming a scarce resource. Thus, more and lower quality sands comprising unwanted impurities or contaminants, either from natural sources or from recycling processes, have to be used.

Unfortunately, the presence of certain contaminants, such as e.g. swelling clays, even in very low amounts, has a huge impact on the effectiveness of PCE-based admixtures in mortar or concrete production.

This is because PCEs intercalate in swelling clays and, thus, a significant proportion of the added PCEs is lost and cannot adsorb anymore on cement or cement hydrates so that the desired water-reducing effect cannot be achieved. Consequently, the flowability of mortar or concrete with a given PCE dosage is significantly reduced if swelling clays are present.

Concrete producers are typically addressing this problem either by using a higher PCE dosage to compensate the loss of PCE performance, or by adding special additives being able to reduce or block the influence of swelling clays, i.e. so-called swelling clay blockers.

Although increasing the PCE dosage is in principle a straightforward solution, it is economically inefficient and can be problematic if the swelling clay content is fluctuating. In this case, the concrete producer is constantly forced to adjust the PCE dosage in order to keep a certain flowability, which is highly time-consuming.

Regarding clay-blocking additives, there are various approaches known nowadays. For example, WO 2010/005117 A1 (W. R. Grace) describes a method in which polycationic compounds in combination with a hydroxycarboxylic acid or a salt thereof is used to enhance slump retention in cements and concretes having clay-bearing aggregates, wherein the clay otherwise absorbs or diminishes the efficiency of polycarboxylate superplasticizers.

WO 2016/096970 A1 (BASF SE) describes a method of inhibiting the swelling of clay in subterranean formations with a polyimidazolium compound.

Additionally there are products on the market with swelling clay-blocking properties which are based on a strong water-reducing effect. Products sold by BASF under the brand "MasterSuna" can be mentioned here.

However, these approaches have to be improved regarding effectiveness, robustness toward fluctuations of swelling clays, compatibility with concrete admixtures or lower chloride content.

There is thus a need to develop new and improved solutions which reduce or overcome the aforementioned drawbacks.

DISCLOSURE OF THE INVENTION

It is an objective of the present invention to provide substances and methods which allow for reducing or preventing problems with swelling clays in mineral binder compositions. Desirably, the substances or methods shall reduce the negative influence of swelling clays on the effectiveness of dispersants, in particular of PCE-based dispersants. Preferably, the duration of action should be as long as possible. Especially, the substances or methods shall be as effective as possible while having a best possible robustness. Preferably, the substances or methods as such shall affect the flowability of mineral binder compositions as little as possible. Also, preferably, the substances and methods should be as insensitive as possible with regard to fluctuating swelling clay contents in mineral binder compositions. Particularly, the substances or methods shall be compatible with common additives used for producing mineral binder compositions, or with corresponding processes, respectively. Especially, the substances or methods shall be compatible with lignosulfonates, gluconates, naphthalenesulfonates, sulfonated naphthalene-formaldehyde condensates, melamine sulfonates, vinyl copolymers, sulfonated vinyl copolymers, and/or polycarboxylates, especially polycarboxylate ethers. In particular, the substances or methods shall be compatible with PCE-based dispersants. Also, the substances or methods should have a content of chloride as low as possible or should be substantially free from chloride.

Surprisingly, it has been found that the problem of the invention can be solved by the features of claim 1. Thus, the core of the invention is a comb polymer, in particular for use as a clay-inerting agent, comprising:
  a) at least one poly(alkylene oxide) side chain-bearing monomer unit M1 without ionic groups,
  b) optionally at least one cationic monomer unit MC,
  c) optionally at least one anionic monomer unit MA,
  d) optionally, at least one non-ionic monomer unit M3,
wherein the molar ratio of the cationic monomer units MC to the side chain-bearing monomer units M1 is equal to or less than 10, the molar ratio of the anionic monomer units MA to the side chain-bearing monomer units M1 is less than 1, preferably equal to or less than 0.5, and the molar ratio of the non-ionic monomer units M3 to the side chain-bearing monomer units M1 is less than 5.

As has been shown, the inventive comb polymers allow for a highly efficient reduction of the negative influence of swelling clays on the effectiveness of dispersants, in particular of PCE-based dispersants, in mineral binder compositions containing swelling clays. Thereby, the inventive solution turned out to be highly robust and the comb polymers only have little effect on the flowability of mineral binder compositions. Specifically, the dosage of the comb polymer according to the invention is rather uncritical, especially if a certain threshold has been reached. Therefore, fluctuating contents of swelling clays in mineral binder compositions are much less of an issue with the inventive comb polymers. Thus, the comb polymers according to the invention can be used as clay-inerting or clay-blocking agents, especially in combination with PCE-based dispersants.

Specifically, the comb polymers according to the invention typically have a rather high grafting density of poly (alkylene oxide) side chains, which is in particular higher than the grafting density of usual PCE-based dispersants. Without being bound by theory, it is believed that comb polymers according to the invention intercalate in swelling clays via their side chains.

In view of this theory, single poly(alkylene oxide) side chains, such as e.g. methyl polyethylene glycols, which are not part of a comb polymer structure should as well be good blocking additives. Nevertheless, it was surprisingly found that the comb polymers according to the invention are much better blocking additives when compared to single poly (alkylene oxide) side chains. Even when using the same or higher dosages of single poly(alkylene oxide) side chains, these single side chains are not able to reduce or prevent intercalation of PCE-based dispersants to the same extent as the inventive comb polymers.

Moreover, the inventive comb polymers turned out to be at least as efficient as known blocking additives such as polycations or like known blocking additives having a strong plasticizing effect.

Further aspects of the invention are the subject matter of other independent claims. Especially preferred embodiments of the invention are the subject matter of the dependent claims.

WAYS OF CARRYING OUT THE INVENTION

A first aspect of the invention relates to a comb polymer, in particular for use as a clay-inerting agent, comprising:
  a) at least one poly(alkylene oxide) side chain-bearing monomer unit M1 without ionic groups,
  b) optionally at least one cationic monomer unit MC,
  c) optionally at least one anionic monomer unit MA,
  d) optionally, at least one non-ionic monomer unit M3,
wherein the molar ratio of the cationic monomer units MC to the side chain-bearing monomer units M1 is equal to or less than 10, especially less than 5, the molar ratio of the anionic monomer units MA to the side chain-bearing monomer units M1 is less than 1, preferably equal to or less than 0.5, and wherein the molar ratio of the non-ionic monomer units M3 to the side chain-bearing monomer units M1 is less than 5.

Thereby, the monomer units M1, MC, MA and M3 differ from each other chemically and/or structurally. In particular, the at least one non-ionic monomer unit M3 does note comprise poly(alkylene oxide) groups, especially it does not comprise poly(ethylene oxide) groups.

Within the present context, a "polymer" is a substance comprising or consisting of at least 2, especially at least 3, preferably at least 5, polymerized monomer units.

A "comb polymer" is a polymer comprising a polymer backbone and side chains bonded thereto.

The term "mineral binder" denotes a binder which reacts in the presence of water in a hydration reaction to form solid hydrates or hydrate phases. This can be, for example, a hydraulic binder, a latent hydraulic binder, and/or a pozzolanic binder. Highly preferred are hydraulic binders. Hydraulic binders can set under water. But it can also be advantageous for the mineral binder to contain other binders in addition to or instead of a hydraulic binder. These are, in particular, latent hydraulic binders and/or pozzolanic binders. Suitable latent hydraulic and/or pozzolanic binders are, e.g., slag, fly ash, silica dust and/or natural pozzolans.

In particular the mineral binder comprises or consists of cement, especially cement of type CEM I, CEM II, CEM III, CEM IV and/or CEM V (according to the standard EN 197-1).

In one preferred embodiment, with respect to the overall mineral binder content, the mineral binder contains at least 5 wt.-%, especially at least 20 wt.-%, preferably at least 35 wt.-%, especially at least 65 wt.-%, of hydraulic binder, especially cement, and, optionally, 5 to 95 wt.-%, especially 5 to 65 wt.-%, particularly 15 to 35 wt.-%, of latent hydraulic and/or pozzolanic binder.

The terms "clay-inerting agent", "clay-blocking agent" and "clay blocker" are meant to be agents capable of reducing or inhibiting adverse effects of swellable clays on the effectiveness of dispersants, in particular of PCE-based dispersants, in mineral binder compositions.

The terms "swelling clay" or "swelling clays" stand in particular for clay minerals which expand and/or increase their volume when wetted by aqueous solutions. Structurally talking, swelling clays are layered silicate minerals and, more specific, phyllosilicate minerals based on tetrahedral $MO_4$ sheets (M=$Si^{4+}$, $Al^{3+}$) and octahedral $M(O,OH)_6$ sheets (M=$Al^{3+}$, $Mg^{2+}$, $Fe^{2+/3+}$, etc.). They differ from each other by their way of stacking the tetrahedral and octahedral sheets, which strongly influences their capacity of adding or losing water molecules or cations from their structure. The most common swelling clays are part of the 2:1 clay group. These are clays in which an octahedral sheet (O) is sandwiched between two tetrahedral sheets (T) forming an elementary unit, in this case a T-O-T layer. The elementary units are bound to each other, forming a stack of layers. The bonding is a result of the formation of an interlayer between two elementary units, called the Z-sheet, which in swelling clays contains cations that will hold the two layers together. As an example, in the non-swelling clay muscovite, potassium ions are located in the Z-layer. These potassium ions in 2:1 clays can be lost due to weathering processes that form a potassium-depleted Z-sheet, which in aqueous solution will lead to an expansion of the Z-layer. Additionally, potassium can be partly replaced by other ions like calcium, sodium or even other ions.

Weathering of rocks is an important natural process enhancing the formation of these minerals. Swelling clays that can be formed are for example minerals from the smectite group, such as montmorillonite, nontronite, beidellite, saponite, hectorite, sauconite. Other swelling clays, which are not explicitly mentioned here, are also encompassed by the term "swelling clay", e.g. vermiculites. After the weathering process of the rocks, the swelling clays are mobilized and found in the aggregates, e.g. sand aggregates.

Thus, in particular, the comb polymers according to the present invention are used in compositions comprising such swelling clays, especially montmorillonite, nontronite, beidellite, saponite, hectorite, sauconite, and/or vermiculites.

Especially, the swellable clays are clays which are part of the 2:1 clay group. Hence, in particular, the comb polymers according to the present invention are used in compositions comprising such swelling clays which are part of the 2:1 clay group.

The terms "ionic group" or "ionic groups" especially mean groups that, at least at a pH >10, especially at least at a pH >12, are present in negatively charged form or in positively charged form. In the present context, groups present in negatively charged form are called "anionic groups". Groups present in positively charged form are called "cationic groups". Thereby, counter ions which are solely bound by ionic bonding are not to be considered with regard to the charge of the ionic groups.

The terms "cationic monomers" and "cationic monomer units" especially mean monomers or polymerized monomers that, at least at a pH >10, especially at least at a pH >12, are present in positively charged form. Thereby, counter ions which are bound by ionic bonding are not to be considered with regard to the charge of the "cationic monomers" or the "cationic monomer units".

Likewise, the terms "anionic monomers" and "anionic monomer units" especially mean monomers or polymerized monomers that, at least at a pH >10, especially at least at a pH >12, are present in negatively charged form. Also in this case, counter ions which are bound by ionic bonding are not to be considered with regard to the charge of the "anionic monomers" or the "anionic monomer units".

Especially, anionic monomers are monomers comprising anionic groups such as e.g. hydrogen donor groups or acid groups. The anionic groups are more preferably acid groups, for example carboxylic acid, sulfonic acid, phosphoric acid and/or phosphonic acid groups. Preference is given to carboxylic acid groups. The anionic groups or acid groups may also take the form of anions in deprotonated form or of a salt with a counter ion or cation.

Cationic monomers are monomers comprising cationic groups. Thereby, the cationic group is covalently attached to the cationic monomer. It may be a common cationic group which can be attached to organic polymers, in particular an ammonium, sulfonium and/or phosphonium group. The cationic groups may also take the form of a salt with a counter ion or anion.

The cationic group is in particular grafted onto the backbone of the comb polymer. This means that it is not part of the main chain or backbone of the comb polymer. Therefore, it does not connect subunits of the main chain to one another. Thereby it differs, for example, from the condensates of dimethylamine and epichlorohydrin of US 20070287794 A1.

The terms "non-ionic monomers" and "non-ionic monomer units" especially mean monomers or polymerized monomers which do not have any ionic groups, in particular they neither have any anionic groups nor any cationic groups. Especially, the non-ionic monomers, at a pH >10, especially at a pH >12, are present in uncharged form.

Also, the at least one poly(alkylene oxide) side chain-bearing monomer unit M1 does not comprise any ionic groups, in particular it neither has any anionic groups nor any cationic groups. Especially, the at least one poly(alkylene oxide) side chain-bearing monomer unit M1 does not comprise any carboxylic acid, sulfonic acid, phosphoric acid, and phosphonic acid groups and/or the at least one poly(alkylene oxide) side chain-bearing monomer unit M1 does not comprise any ammonium, sulfonium and/or phosphonium groups, in particular quaternary ammonium groups.

Especially, the at least one poly(alkylene oxide) side chain-bearing monomer unit M1, at a pH >10, especially at a pH >12, is present in uncharged form.

Especially, the at least one poly(alkylene oxide) side chain-bearing monomer unit M1 is bonded to the polymer backbone via ester, ether, amide and/or imide groups. The at least one poly(alkylene oxide) side chain-bearing monomer unit M1 preferably includes poly(ethylene oxide) side chains, poly(propylene oxide) side chains and/or poly(ethylene oxide/propylene oxide) side chains. In particular, the number average molecular weight of the poly(alkylene oxide) side chains is in the range of 100-10'000 g/mol, especially 250-5'000 g/mol, preferably 500-3'500 g/mol, in particular 900-2'500 g/mol, for example 950-1'500 g/mol or 1'000-1'400 g/mol.

Particularly, the side chain-bearing monomer unit M1 includes a structure of the formula I:

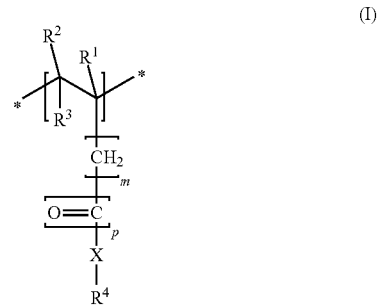

(I)

where
$R^1$, and $R^2$, in each case independently, are H or an alkyl group having 1 to 5 carbon atoms, preferably H or $CH_3$ or mixtures thereof,
$R^3$, in each case independently, is H, an alkyl group having 1 to 5 carbon atoms, preferably H or $CH_3$ or mixtures thereof, or a group with formula

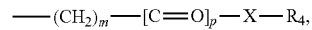

$m=0$, 1 or 2,
$p=0$ or 1,
X, in each case independently, is —O— or —NH—,
$R^4$ is a group of the formula -$[AO]_n$—$R^a$
where $A=C_2$- to $C_4$-alkylene, $R^a$ is H, a $C_1$- to $C_{20}$-alkyl group, -cycloalkyl group or -alkylaryl group,
and $n=2$-250, especially 10-200, in particular 15-50 or 20-25.

More particularly, $R^1$=H or $CH_3$ and $R^2=R^3$=H.

The X group in monomer units M1, advantageously in at least 75 mol %, particularly in at least 90 mol %, especially in at least 95 mol % or at least 99 mol % of the total number of monomer units M1, is —O— (=oxygen atom).

In a further advantageous embodiment, $m=0$, $p=1$ and preferably X=—O—. In this case it is possible to prepare the copolymer on the basis of (meth)acrylic esters which are commercially available.

In another advantageous embodiment, $m=0$-2, $p=0$ and preferably X=—O—. Thereby, it is possible to prepare the copolymer on the basis of vinyl ether, (meth)allyl ether or isoprenyl ether monomers which are commercially available.

In a particularly advantageous embodiment, $R^1$ is a mixture of 40-60 mol % of H and 40-60 mol % of —$CH_3$.

The $R^4$ moiety in the side chain-bearing monomer units M1, based on the total number of $R^4$ moieties in the monomer units, in particular consists of a poly(ethylene oxide), especially to an extent of at least 50 mol %, especially at least 75 mol %, preferably at least 95 mol % or at least 99 mol %.

The proportion of ethylene oxide units, based on the total number of alkylene oxide units in the copolymer, is especially more than 75 mol %, especially more than 90 mol %, preferably more than 95 mol % and specifically 100 mol %.

More particularly, $R^4$ has essentially no hydrophobic groups, especially no alkylene oxides having three or more carbon atoms. This especially means that the proportion of alkylene oxides having three or more carbon atoms based on the total number of alkylene oxides is less than 5 mol %, especially less than 2 mol %, preferably less than 1 mol % or less than 0.1 mol %. In particular, there are no alkylene oxides having three or more carbon atoms present, i.e. the proportion thereof is 0 mol %.

$R^a$ is advantageously H and/or a methyl group. Particularly advantageously, $A=C_2$-alkylene and $R^a$ is H or a methyl group.

More particularly, $n=10-150$, especially $n=15-100$, preferably $n=17-70$, specifically $n=19-45$ or $n=20-25$. In particular, this achieves excellent blocking effects.

Particular preference is given to copolymers in which $R^1$ is selected from the group consisting of H, —$CH_3$, and mixtures thereof; $R^2$ and $R^3$=H; $R^4$, based on the total number of $R^4$ moieties in the monomer units, consists of a poly(ethylene oxide) especially to an extent of at least 50 mol %, especially at least 75 mol %, preferably at least 95 mol % or at least 99 mol %; and X in at least 75 mol %, particularly in at least 90 mol %, especially in at least 99 mol %, of the total number of monomer units M1 is —O—.

According to a preferred embodiment, the cationic group of the cationic monomer unit MC in the comb polymer includes or consists of an ammonium group, a sulfonium group and/or or a phosphonium group, in particular a quaternary ammonium group.

In a preferred embodiment of the invention, the cationic group is an ammonium group. Particularly preferably it is a quaternary ammonium group. In this case, a positively charged nitrogen atom is substituted with four organic groups Preferably, the cationic group has formula —$N^+R^{10}R^{11}R^{12}$, wherein $R^{10}$, $R^{11}$ and $R^{12}$ are independently of one another H, an aliphatic hydrocarbon moiety having 1 to 20 C atoms, a cycloaliphatic hydrocarbon moiety having 5 to 8 C atoms and/or an aryl moiety having 6 to 14 C atoms. As indicated by the hyphen, the positively charged nitrogen atom in the group of formula —$N^+R^{10}R^{11}R^{12}$ is chemically or covalently bonded, optionally via a chemical linker group, to the cationic monomer. Preferably, $R^{10}$, $R^{11}$ and $R^{12}$ are not H, particularly preferably selected from methyl and ethyl.

Especially, the cationic monomer unit MC in the polymer includes or consists of a cationic monomer which has a structure of the formula II:

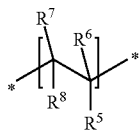

(II)

where $R^5$, in each case independently, is -$[D]_d$-$[E]_e$-F, with
D=—(COO)— and/or —(CONH)—,
E=an alkylene group having 1 to 5 carbon atoms,
F=—$N^+R^{10}R^{11}R^{12}$, —$S^+R^{10}R^{11}R^{12}$ and/or —$P^+R^{10}R^{11}R^{12}$, wherein $R^{10}$, $R^{11}$ and $R^{12}$ are independently of one another H, an aliphatic hydrocarbon moiety having 1 to 20 C atoms, a cycloaliphatic hydrocarbon moiety having 5 to 8 C atoms and/or an aryl moiety having 6 to 14 C atoms;

whereby d=0 or 1,
e=0 or 1,
$R^6$, $R^7$ and $R^8$, in each case independently, are H or an alkyl group having 1 to 5 carbon atoms.

Thereby, preferably, $R^6$=H or $CH_3$, $R^7$=$R^8$=H, d=1 and, especially D=—(COO)—.

According to a preferred embodiment, F=—$N^+R^{10}R^{11}R^{12}$, e=1 and, preferably E=an alkylene group having 2 to 3 carbon atoms.

In a preferred embodiment of the invention, the ionic monomer is selected from [2-(acryloyloxy)-ethyl]trimethylammonium chloride, [2-(acryloylamino)-ethyl]trimethylammonium chloride, [2-(acryloyloxy)-ethyl]trimethy-lammoniummethosulfate, [2-(methacryloyloxy)-ethyl]trimethylammonium chloride or methosulfate, [3-(acryloylamino)-propyl]trimethylammonium chloride, [3-(methacryloylamino)-propyl]trimethylammonium chloride.

Particularly advantageous according to the invention proved to be the use of [2-(methacryloyloxy)-ethyl]trimethylammonium salts, in particular the chloride. The use is commercially available from Evonik Industries, DE (under the brand name "Visiomer TMAEMC") or from Sigma-Aldrich, DE.

According to another preferred embodiment, the comb polymer is essentially free of a cationic monomer unit MC. This means that a proportion of cationic monomer units MC in the comb polymer is 0-1 mol-%, especially 0-0.1 mol-%, preferably 0 mol-%, with respect to the total number of monomer units present in the comb polymer.

In a further preferred embodiment, an anionic group of the anionic monomer unit MA in the comb polymer includes or consists of a carboxylic acid, sulfonic acid, phosphoric acid and/or phosphonic acid group.

Preferably, the anionic monomer unit MA in the polymer includes or consists of an anionic monomer which has a structure of the formula III

(III)

where $R^{13}$, in each case independently, is —COOM, —$SO_2$—OM, —O—PO(OM)$_2$ and/or —PO(OM)$_2$, $R^{14}$ and $R^{15}$, in each case independently, are H or an alkyl group having 1 to 5 carbon atoms, $R^{16}$, in each case independently, are H, —COOM or an alkyl group having 1 to 5 carbon atoms, or where $R^{13}$ forms a ring together with $R^{16}$ to give —CO—O—CO—, M independently from each other is $H^+$, an alkali metal ion, an alkaline earth metal ion, a di- or trivalent metal ion, an ammonium ion and an organic ammonium group.

More particularly, $R^{13}$=COOM, $R^{14}$=H or $CH_3$, $R^{15}$=$R^{16}$=H. It is thus possible to prepare the copolymer on the basis of acrylic or methacrylic acid monomers, which is of interest from an economic point of view.

Likewise advantageously, $R^{13}$=COOM, $R^{14}$=H, $R^{15}$=H and $R^{16}$=COOM. Corresponding comb polymers can be prepared on the basis of maleic acid monomers.

According to another preferred embodiment, the comb polymer is essentially free of an anionic monomer unit MA. This means that a proportion of anionic monomer units MA in the comb polymer is 0-1 mol-%, especially 0-0.1 mol-%, preferably 0 mol-%, with respect to the total number of monomer units present in the comb polymer.

It may further be advantageous if the comb polymer comprises at least one further non-ionic monomer unit M3 which especially differs chemically and/or structurally from the monomer units M1, MC and MA. In particular, multiple different further monomer units M3 may be present. In this way, it is possible to further modify the properties of the comb polymer and to adjust them, for example, with regard to specific applications.

Particularly advantageously, the non-ionic monomer unit M3 a monomer unit of the formula IV:

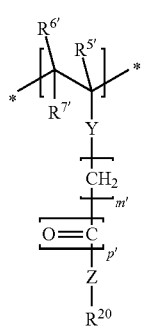

(IV)

where $R^{5'}$, $R^{6'}$, $R^{7'}$ are the same as defined for $R^6$, $R^7$ and $R^8$, and m' and p' are the same as defined for m and p as described above in the context of the copolymer;

Y, in each case independently, is a chemical bond or —O—;

Z, in each case independently, is a chemical bond, —O— or —NH—;

$R^{20}$, in each case independently, is an alkyl group, cycloalkyl group, alkylaryl group, aryl group, hydroxyalkyl group or acetoxyalkyl group, each having 1-20 carbon atoms.

Advantageous examples of non-ionic monomer units M3 are those where m'=0, p'=0, Z and Y represent a chemical bond and $R^{20}$ is an alkylaryl group having 6-10 carbon atoms.

Also suitable are especially further monomer units M3 in which m'=0, p'=1, Y is —O—, Z represents a chemical bond and $R^{20}$ is an alkyl group having 1-4 carbon atoms.

Further suitable are further monomer units M3 where m'=0, p'=1, Y is a chemical bond, Z is —O— and $R^{20}$ is an alkyl group and/or a hydroxyalkyl group having 1-6 carbon atoms.

Particularly advantageously, the non-ionic monomer unit M3 consists of polymerized vinyl acetate, styrene and/or hydroxyalkyl (meth)acrylate, especially styrene.

According to another preferred embodiment, the comb polymer is essentially free of a non-ionic monomer unit M3. This means that a proportion of non-ionic monomer units M3 in the comb polymer is 0-1 mol-%, especially 0-0.1 mol-%, preferably 0 mol-%, with respect to the total number of monomer units present in the comb polymer.

According to a preferred embodiment, the comb polymer, with respect to the total number of monomer units present in the comb polymer, comprises 20-100 mol-%, in particular 50-100 mol-%, especially 65-100 mol-%, for example 80-100 mol-% or 95-100 mol-%, of the at least one poly(alkylene oxide) side chain-bearing monomer unit M1.

Especially, a preferred comb polymer, with respect to the total number of monomer units present in the comb polymer, comprises:

a) 95-100 mol-%, especially 97-100 mol-%, particularly or 98-100 mol-%, preferably 99.5 mol-%, of the at least one poly(alkylene oxide) side chain-bearing monomer unit M1, b) 0-1 mol-%, especially 0-0.1 mol-%, preferably 0 mol-%, of the at least one cationic monomer unit MC, c) 0-1 mol-%, especially 0-0.1 mol-%, preferably 0 mol-%, of the at least one anionic monomer unit MA, d) 0-1 mol-%, especially 0-0.1 mol-%, preferably 0 mol-%, of the at least one non-ionic monomer unit M3.

In such or other preferred comb polymers, the molar ratio of the cationic monomer units MC to the side chain-bearing monomer units M1 is equal to or less than 0.5, especially less than or equal to 0.1, in particular less than or equal to 0.01 or 0.

the molar ratio of the anionic monomer units MA to the side chain-bearing monomer units M1 is equal to or less than 0.5, especially less than or equal to 0.1, in particular less than or equal to 0.01 or 0.

the molar ratio of the non-ionic monomer units M3 to the side chain-bearing monomer units M1 is equal to or less than 0.5, especially less than or equal to 0.1, in particular less than or equal to 0.01 or 0.

In particular, the comb polymer, with respect to the total number of monomer units present in the comb polymer, comprises 100 mol-% of the at least one poly(alkylene oxide) side chain-bearing monomer unit M1. In this case, the comb polymer can be a homopolymer of identical side chain-bearing monomeric units M1 or a copolymer of at least two different side chain-bearing monomeric units M1.

Such comb polymers are for example preferred if the comb polymer comprises side chain-bearing monomer units M1 including or consisting of a structure of formula I as shown above wherein parameter p is equal to 1. These are for example poly(alkylene oxide) (meth)acrylate based monomer units M1.

According to another preferred embodiment, the comb polymer essentially consists of the at least one poly(alkylene oxide) side chain-bearing monomer unit M1 and the non-ionic monomer unit M3. In this case the comb polymer is a copolymer based on the at least one side chain-bearing monomeric units M1 and the non-ionic monomer unit M3.

Such comb polymers are for example preferred if the comb polymer comprises side chain-bearing monomer units M1 including or consisting of a structure of formula I as shown above wherein parameter p is equal to 0. These are for example poly(alkylene oxide) alkenyl ether-based monomer units M1.

For example, a preferred comb polymer, with respect to the total number of monomer units present in the comb polymer, comprises:

a) 30-70 mol-%, especially 40-60 mol-%, particularly or 40-50 mol-%, of the at least one poly(alkylene oxide) side chain-bearing monomer unit M1, and b) 0-1 mol-%, especially 0-0.1 mol-%, preferably 0 mol-%, of the at least one cationic monomer unit MC, c) 0-1 mol-%, especially 0-0.1 mol-%, preferably 0 mol-%, of the at least one anionic monomer unit MA, d) 30-70 mol-%, especially 40-60 mol-%, particularly or 40-50 mol-%, of the at least one non-ionic monomer unit M3.

In such or other preferred comb polymers, the molar ratio of the cationic monomer units MC to the side chain-bearing monomer units M1 is equal to or less than 0.5, especially less than or equal to 0.1, in particular less than or equal to 0.01 or 0.

the molar ratio of the anionic monomer units MA to the side chain-bearing monomer units M1 is equal to or less than 0.5, especially less than or equal to 0.1, in particular less than or equal to 0.01 or 0.

the molar ratio of the non-ionic monomer units M3 to the side chain-bearing monomer units M1 is 0.1-5, especially 0.5-2.5, in particular 0.8-2 or 1-1.5.

In a further preferred embodiment, the comb polymer comprises the at least one cationic monomer MC. Thereby, preferably, the comb polymer consists to an extent of at least 30 mol %, particularly at least 50 mol %, in particular at least 65 mol %, especially at least 90 mol % or 95 mol %, of side chain-bearing monomer units M1 and the cationic monomer units MC, with respect to the total number of monomer units present in the comb polymer. The remaining monomer units can e.g. be the non-ionic monomer units M3. Especially, the comb polymer consists of the at least one poly(alkylene oxide) side chain-bearing monomer units M1 and the at least one cationic monomer units MC.

For example, a further preferred comb polymer, with respect to the total number of monomer units present in the comb polymer, comprises:

a) 10-99 mol-%, especially 40-95 mol-%, particularly or 50-75 mol-%, of the at least one poly(alkylene oxide) side chain-bearing monomer unit M1, and b) 1-90 mol-%, especially 5-60 mol-%, preferably 25-50 mol-%, of the at least one cationic monomer unit MC, c) 0-1 mol-%, especially 0-0.1 mol-%, preferably 0 mol-%, of the at least one anionic monomer unit MA, d) 0-75 mol-%, especially 5-60 mol-%, particularly 25-50 mol-% or 0 mol-%, of the at least one non-ionic monomer unit M3.

In such or other preferred comb polymers, the molar ratio of the cationic monomer units MC to the side chain-bearing monomer units M1 is 0.1-5, especially 0.5-2.5, in particular 0.8-2 or 1-1.5, the molar ratio of the anionic monomer units MA to the side chain-bearing monomer units M1 is equal to or less than 0.5, especially less than or equal to 0.1, in particular less than or equal to 0.01 or 0, the molar ratio of the non-ionic monomer units M3 to the side chain-bearing monomer units M1 is 0-5, especially 0.1-2.5, in particular 0.5-2 or 0.8-1.5.

Thereby, in particular, the molar ratio of the anionic monomer units MA to the cationic monomer units MC is in the range of 0-1, especially 0-0.9, in particular 0-0.5 or 0-0.05.

In an especially preferred embodiment, the comb polymer is a block copolymer, whereby at least 75 mol-%, especially at least 90 mol-%, preferably at least 99 mol-%, of the total number of at least one side chain-bearing monomer units M1 are arranged in a first block of the block copolymer.

In particular, the block copolymer comprises a second block in which at least 75 mol-%, especially at least 90 mol-%, preferably at least 99 mol-%, of the total number of at least one cationic monomer units MC are arranged.

In a further preferred embodiment, between the first block and the second block, there is a third block comprising at least one side chain-bearing monomer unit M1, at least one cationic monomer unit MC and/or at least one non-ionic monomer unit M3. Especially, the third block has a non-random distribution of the monomer units M1 and/or the cationic monomer units MC in a direction along the polymer backbone.

A "non-random distribution" is understood in the present case to mean a non-statistical distribution of the monomer units M1 and/or the monomer units MC. This means that the side chain-bearing monomer units M1 and/or the ionic units MC are arranged in the third block, for example, in an alternating manner and/or in a gradient structure.

The structure of the copolymers can be analyzed and determined, for example, by nuclear magnetic resonance spectroscopy (NMR spectroscopy). By 13C and 1H NMR spectroscopy in particular, the sequence of the monomer units in the copolymer can be determined on the basis of neighboring group effects in the copolymer and by using statistical evaluations.

In all of the structures described above, non-ionic monomer units M3 may be added, for example in order to control the density of the other monomeric units in the comb polymer and/or in order to adjust the comb polymer for specific needs.

Preferably, if used, the molar proportion of the non-ionic monomer units M3, with respect to the total number of the monomeric units in the comb polymer, is from 0.0001-50 mol-%, in particular 0.0002-30 mol-%, especially 0.001-25 mol-%, advantageously 0.1-10 mol-% or 1-9 mol-%. This is in particular valid for block copolymers.

The comb polymer is especially prepared by free-radical polymerization, e.g. by conventional free-radical polymerization or by controlled free-radical polymerization (also called living free-radical polymerization). These polymerization techniques are well known to the skilled person.

Thereby, unilaterally ethylenically unsaturated poly(alkylene oxide) side chain-bearing monomer units M1' according to formula V, optionally at least one unilaterally ethylenically unsaturated ionic monomer unit MC' and/or MA' according to formula VI and/or VII and, optionally, at least one unilaterally ethylenically unsaturated non-ionic monomer unit M3' according to formula VIII, are polymerized together such that the molar ratio of the cationic monomer units MC to the side chain-bearing monomer units M1 is equal to or less than 10, especially less than 5, the molar ratio of the anionic monomer units MA to the side chain-bearing monomer units M1 is less than 1, preferably equal to or less than 0.5, and the molar ratio of the non-ionic monomer units M3 to the side chain-bearing monomer units M1 is less than 5.

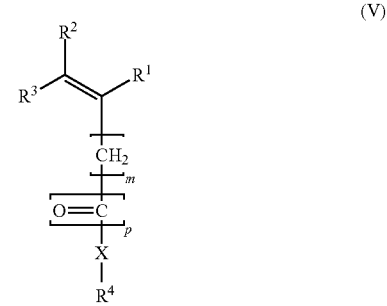

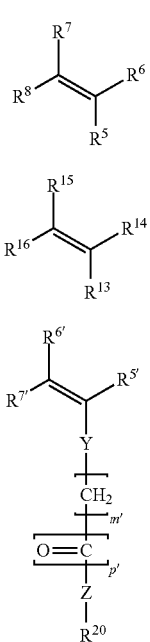

Thereby, $R^1$-$R^{16}$, $R^{5'}$-$R^{7'}$, $R^{20}$, X, Y, Z, m, m', n and p, p' are defined as described above.

Among controlled free-radical polymerization techniques, reversible addition-fragmentation chain-transfer polymerization (RAFT), nitroxide-mediated polymerization (NMP) and/or atom transfer radical polymerization (ATRP) can be used.

In reversible addition-fragmentation chain-transfer polymerization, control over the polymerization is achieved by a reversible chain transfer reaction. Specifically, a growing free-radical chain adds to what is called a RAFT agent, which leads to formation of an intermediate free radical. The RAFT agent then fragments, in such a way as to reform another RAFT agent and a free radical available for propagation. In this way, the probability of propagation is distributed uniformly over all chains. The average chain length of the polymer formed is proportional to the RAFT agent concentration and to the reaction conversion. RAFT agents used are especially organic sulfur compounds. Particularly suitable are dithioesters, dithiocarbamates, trithiocarbonates and/or xanthates. The polymerization can be initiated in a conventional manner by means of initiators or thermal self-initiation.

In nitroxide-mediated polymerization, nitroxides react reversibly with the active chain end to form what is called a dormant species. The equilibrium between active and inactive chain ends is strongly to the side of the dormant species, which means that the concentration of active species is very low. The probability of two active chains meeting and terminating is thus minimized. An example of a suitable NMP agent is the substance with Chemical Abstract number 654636-62-1, commercially available e.g. under the tradename "Blockbuilder MA".

In atom transfer radical polymerization (ATRP), the concentration of free radicals is lowered by addition of a transition metal complex and a controlling agent (halogen-based) to such an extent that chain termination reactions, such as disproportionation or recombination, are very substantially suppressed.

In the present context, reversible addition-fragmentation chain-transfer polymerization (RAFT) has been found to be particularly preferable, especially if block copolymers are to be produced.

The initiator used for the polymerization is more preferably an azo compound and/or a peroxide as free-radical initiator, which is at least one representative selected from the group consisting of dibenzoyl peroxide (DBPO), di-tert-butyl peroxide, diacetyl peroxide, azobisisobutyronitrile (AIBN), α,α'-azodiisobutyramidine dihydrochloride (AAPH) and/or azobisisobutyramidine (AIBA).

If the polymerization is effected in an aqueous solution or in water, α,α'-azodiisobutyramidine dihydrochloride (AAPH) is advantageously used as initiator.

For control of the polymerization, in particular, one or more representatives from the group consisting of dithioesters, dithiocarbamates, trithiocarbonates and/or xanthates are used.

It has additionally been found to be advantageous if the polymerization is effected at least partly, preferably fully, in an aqueous solution.

In a second method known as polymer-analogous reaction, a polycarboxylic acid backbone is synthesized in a first step. Subsequently, side chains are attached to the polycarboxylic acid backbone, for example by esterification, amidation or etherisation reactions with alcohols, amines and the like. Such polymer-analogous reactions, as well as resulting comb polymers, are described, for example, in WO 97/35814, WO 95/09821, DE 100 15 135 A1, EP 1 138 697 A1, EP 1 348 729 A1 and WO 2005/090416. Details about the polymer-analogous reaction are disclosed, for example, in EP 1 138 697 B1 on page 7, line 20 to page 8, line 50, as well as in its Examples, or in EP 1 061 089 B1 on page 4, line 54 to page 5, line 38 as well as in its Examples.

For formation of copolymers having block and/or gradient structures, unilaterally ethylenically unsaturated poly(alkylene oxide) side chain-bearing monomer units M1' and ethylenically unsaturated ionic monomer units MC' and/or MA' and/or the ethylenically unsaturated non-ionic monomer units M3' are preferably at least partly added at different times.

In a further preferred embodiment, in the polymerization, in a first step a), a portion of the monomer units M1' is converted or polymerized and, after reaching a predetermined conversion, in a second step b), the as yet unconverted monomer units M1' (if present) are polymerized together with ionic monomer unit MC' and/or MA' and/or the non-ionic monomer unit M3'. Step a) is especially effected essentially in the absence of ionic monomer units MC' and/or MA' and M3'.

In this way, in a simple and inexpensive manner, a copolymer having a section consisting essentially of polymerized monomer units M1' followed by a section having a gradient structure is preparable.

It is advantageous here to conduct steps a) and b) in immediate succession. In this way, it is possible to maintain the polymerization reaction in steps a) and b) to the best possible degree.

The polymerization in step a) is especially conducted until 0.1-100 mol %, especially 1-95 mol %, preferably 10-90 mol %, in particular 25-85 mol %, especially 60-85 mol % of monomer units M1' have been converted or polymerized.

The conversion of the monomers or the progress of the polymerization can be monitored in a manner known per se, for example, with the aid of liquid chromatography, especially high-performance liquid chromatography (HPLC).

A further aspect of the present invention is related to a kit of parts comprising a comb polymer as described above and a plasticizer for mineral binder compositions. Thereby, plasticizer and comb polymer differ from a chemical and/or structural point of view. The kit of parts can also be present in the form of a premixed composition comprising the comb polymer and the plasticizer for mineral binder compositions.

What is meant by the term "plasticizer" in the present context is especially a substance which is capable of improving the flowability of mineral binder compositions, e.g. mortar and/or cement compositions which have been mixed with water, and/or of reducing the water requirement of such compositions. Substances of this kind are also referred to as "superplasticizers".

More particularly, the plasticizer comprises at least one representative from the group consisting of lignosulfonates, gluconates, naphthalenesulfonates, sulfonated naphthalene-formaldehyde condensates, melamine sulfonates, vinyl copolymers, sulfonated vinyl copolymers, polycarboxylates, especially polycarboxylate ethers, or mixtures thereof.

More particularly, the plasticizer is a polycarboxylate, especially a polycarboxylate ether. It is more preferably a comb polymer having a polycarboxylate backbone and polyether side chains, where the polyether side chains are bonded to the polycarboxylate backbone via ester, ether, amide and/or imide groups. More particularly, the polycarboxylate has a random, statistical, blockwise, alternating or gradient-like monomer distribution.

More preferably, the superplasticizer is a polymer P having or consisting of the following substructure units:

a) a molar parts of a substructure unit S1 of the formula X

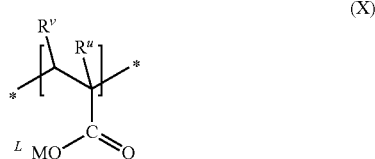

(X)

b) b molar parts of a substructure unit S2 of the formula XI

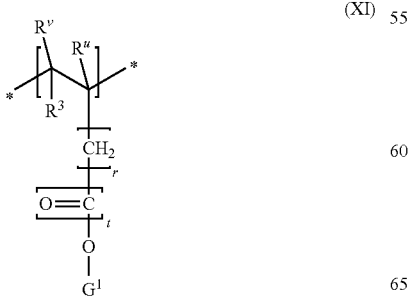

(XI)

c) c molar parts of a substructure unit S3 of the formula (XII)

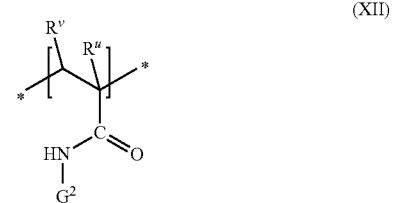

(XII)

d) d molar parts of a substructure unit S4 of the formula (XIII)

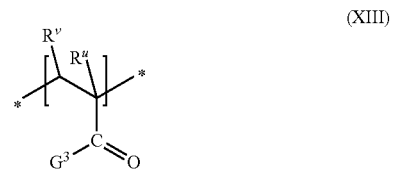

(XIII)

where
L independently represents $H^+$, an alkali metal ion, alkaline earth metal ion, a di- or trivalent metal ion, an ammonium ion or an organic ammonium group,
each $R^u$ independently of the others is hydrogen or a methyl group, each $R^v$ independently of the others is hydrogen or COOM,
r=0, 1 or 2,
t=0 or 1,
$G^1$ and $G^2$ is independently a $C_1$- to $C_{20}$-alkyl group, -cycloalkyl group, -alkylaryl group or is $-[A'O]_s-G^4$, where $A'=C_2$- to $C_4$-alkylene, $G^4$ is H, a $C_1$- to $C_{20}$-alkyl group, -cycloalkyl group or -alkylaryl group, and s=2-250,
$G^3$ is independently $NH_2$, $-NG^5G^6$, $-OG^7NG^8G^9$, where $G^5$ and $G^6$ are independently
a $C_1$- to $C_{20}$-alkyl group, -cycloalkyl group, -alkylaryl group or -aryl group,
or are a hydroxyalkyl group or are an acetoxyethyl group ($CH_3-CO-O-CH_2-CH_2-$) or a hydroxyisopropyl group ($HO-CH(CH_3)-CH_2-$) or an acetoxyisopropyl group ($CH_3-CO-O-CH(CH_3)-CH_2-$);
or $G^5$ and $G^6$ together form a ring of which the nitrogen is part, in order to construct a morpholine or imidazoline ring;
$G^7$ is a $C_2$-$C_4$-alkylene group,
$G^8$ and $G^9$ each independently represent a $C_1$- to $C_{20}$-alkyl group, -cycloalkyl group, -alkylaryl group, -aryl group or a hydroxyalkyl group,
and where a, b, c and d represent molar proportions of the respective substructure units S1, S2, S3 and S4, with
a/b/c/d=(0.1-0.9)/(0.1-0.9)/(0-0.8)/(0-0.8),
especially a/b/c/d=(0.3-0.9)/(0.1-0.7)/(0-0.6)/(0-0.4),
preferably a/b/c/d=(0.5-0.8)/(0.2-0.4)/(0.001-0.005)/0
and with the proviso that a+b+c+d=1.

The sequence of the substructure units S1, S2, S3 and S4 may be alternating, blockwise or random. It is also possible that the one or more substructure units S1, S2, S3 and S4 form a gradient structure. In principle, it is also possible that further structural units are present in addition to the substructure units S1, S2, S3 and S4. In particular, the sequences of the substructure units S1, S2, S3 and S4 in the polymer P are random or statistical.

Preferably, the substructure units S1, S2, S3, and S4 together have a proportion of at least 50% by weight, especially at least 90% by weight, most preferably at least 95% by weight, of the total weight of the polymer P.

In the polymer P, $R^v$ especially represents hydrogen and $R^u$ is preferably hydrogen and/or a methyl group.

Preferably, in the polymer P, r=0 and t=1. Also advantageously, r=1-2 and t=0.

More particularly, in the polymer P, $R^v$ is hydrogen, $R^u$ is a methyl group, r=1-2 and t=0.

$G^1$ and/or $G^2$ in the polymer P, in each case independently, are advantageously $-[A'O]_s-G^4$ with s=8-200, especially 20-70, and A' is a $C_2$- to $C_4$-alkylene.

In the polymer P, $G^4$, in each case independently, is preferably hydrogen or a methyl group.

Especially, a ratio a/b in polymer P is greater than the ratio of monomeric units MC/M1 and/or a ratio of MA/M1 in the comb polymer described above. In particular the ratio a/b in polymer P is in the range of 1-10, in particular 1.5-5, especially 2-4.

Very particularly advantageous polymers P are those where
a) the $R^u$ and $R^v$ moieties are hydrogen,
b) r=0,
c) t=1,
d) $G^1$ and $G^2$, in each case independently, are $-[A'O]_s-G^4$ with s=20-70 and $A'=C_2$-alkylene,
e) $G^4$ represents a methyl group and/or
f) a/b/c/d=(0.5-0.8)/(0.2-0.4)/(0.001-0.005)/0

Likewise advantageous polymers P are those where
a) t=0 and r=1-2,
b) $G^1$, in each case independently, is $-[A'O]_s-G^4$ with s=8-200, especially 20-70.
c) $G^4$ represents hydrogen or a methyl group, especially hydrogen,
d) and/or A' is a $C_2$- to $C_4$-alkylene, especially a $C_2$-alkylene.

A weight-average molecular weight (Mw) of the polymer P is particularly in the range of 5'000-150'000 g/mol, preferably 10'000-100'000 g/mol, especially 20'000-90'000 g/mol. The weight-average molecular weight (Mw) is determined by gel permeation chromatography (GPC), using polyethylene glycol (PEG) as standard.

The preparation of polymers P is known per se to the person skilled in the art. Corresponding superplasticizers or polymers P are also commercially supplied by Sika Schweiz AG under the ViscoCrete® trade name series.

A further aspect of the present invention is a composition comprising a comb polymer as described above and further comprising a mineral binder, aggregates, a plasticizer and/or swellable clays. Thus, the comb polymer can be present in premixed form together with at least one of these components, or the comb polymer is present in a mineral binder composition mixed with water.

Especially, the composition comprises the comb polymer as described above, a mineral binder, aggregates, and swellable clays. In particular, a plasticizer is present as well. Especially, the swellable clays are clays which are part of the 2:1 clay group.

Moreover the present invention is concerned with a method comprising the steps of adding to a composition comprising swellable clays, especially a mineral binder composition comprising swellable clays:
(i) a comb polymer as described above, and
(ii) a plasticizer as described above.

Preferably, the addition of the comb polymer is effected before the addition of the plasticizer. However, it is for example also possible to add the comb polymer and the plasticizer simultaneously. Especially, the swellable clays are clays which are part of the 2:1 clay group.

A further aspect of the present invention is related to the use of a comb polymer as described above as a clay-inerting agent and/or for reducing or inhibiting adverse effects of swellable clays on the effectiveness of dispersants, in particular of PCE-based dispersants, in mineral binder compositions comprising swellable clays. Thereby, the comb polymer can e.g. be used to increase the flowability and/or the processing time of mineral binder compositions comprising swellable clays and a dispersant, in particular a PCE-based dispersant. Especially, the swellable clays are clays which are part of the 2:1 clay group.

Further advantageous embodiments and combinations of features of the invention will emerge from the following exemplary embodiments and the totality of the patent claims.

Exemplary Embodiments

1. Preparation Examples of Comb Polymers 1.1 Comb Polymer P1 (Non-Ionic Homopolymer)

For the preparation of a non-ionic homopolymer by means of controlled free polymerization, a round-bottom flask equipped with a reflux condenser, stirrer system, thermometer and a gas inlet tube was initially charged with 57.4 g of 50% methoxy polyethylene glycol$_{1000}$ methacrylate (0.027 mol; average molecular weight: 1'000 g/mol; ~20 ethylene oxide units per molecule) and 18 g of deionized water. The reaction mixture was heated to 80° C. with vigorous stirring. A gentle inert $N_2$ gas stream is passed through the solution during the whole reaction time. 378 mg of 4-cyano-4-(thiobenzoylthio)pentanoic acid (1.35 mmol) were then added to the mixture. Once the substance had fully dissolved, 67 mg of AIBN (0.41 mmol) were added. From then on, the conversion was regularly checked by means of HPLC.

When the conversion, based on methoxy polyethylene glycol methacrylate, had reached 90%, the reaction was stopped. A clear, reddish, aqueous solution was obtained having a solids content of around 40 wt. % which was diluted with water to obtain a solids content of around 30 wt. %.

The comb polymer thus obtained is a homopolymer comprising about 20 side chain-nearing monomeric units and is referred to as comb polymer P1.

1.2 Comb Polymer P2 (Non-Ionic Homopolymer)

For the preparation of a non-ionic homopolymer by conventional free radical polymerization, a round-bottom flask equipped with a reflux condenser, stirrer system, thermometer and a gas inlet tube was initially charged with 186 g of deionized water. At a temperature of 100° C., 796 g of 50% methoxy polyethylene glycol$_{1000}$ methacrylate (0.37 mol, average molecular weight: 1'000 g/mol; ~20 ethylene oxide units per molecule) was added within 180 minutes. Additionally a solution of 4.5 g sodium hypophosphite and 6.7 g of water was added within 175 minutes and a solution of 0.93 g sodium persulfate and 5.0 g water was added within 190 minutes. Once all the solutions were added, the reaction mixture was cooled down. A clear, colorless solution was obtained having a solids content of around 40 wt.

% which was diluted with water to obtain a solids content of around 30 wt. %.

This polymer is referred to as comb polymer P2.

1.3 Comb Polymer P3 (Cationic Block Copolymer)

For the preparation of a cationic copolymer by means of controlled free radical polymerization, a round-bottom flask equipped with a reflux condenser, stirrer system, thermometer and a gas inlet tube was initially charged with 57.4 g of 50% methoxy polyethylene glycol$_{1000}$ methacrylate (0.027 mol; average molecular weight: 1'000 g/mol; ~20 ethylene oxide units per molecule) and 28.3 g of deionized water. The reaction mixture was heated to 80° C. with vigorous stirring. A gentle inert $N_2$ gas stream was passed through the solution during the whole reaction time. 378 mg of 4-cyano-4-(thiobenzoylthio)pentanoic acid (1.35 mmol) were then added to the mixture. Once the substance had fully dissolved, 67 mg of AIBN (0.41 mmol) were added. From then on, the conversion was regularly checked by means of HPLC.

When the conversion, based on methoxy polyethylene glycol methacrylate, had reached 80%, 14.81 g of [2-(methacryloyloxy)ethyl]trimethylammonium chloride (0.054 mol) were added. The mixture was left to react for a further 2 h and then to cool. A clear, reddish, aqueous solution was obtained having a solids content of around 40 wt. % which was diluted with water to obtain a solids content of around 30 wt. %.

The comb polymer thus obtained is a block copolymer comprising a first bock with about 20 side chain-nearing monomeric units, and a second block with about 40 cationic monomer units. This polymer is referred to as comb polymer P3.

1.4 Further Comb Polymers

Further comb polymers were produced in a similar manner. Thereby, the methoxy polyethylene glycol$_{1000}$ methacrylate was replaced by methoxy polyethylene glycol methacrylate with different chain lengths (average molecular weight of 500 g/mol, 2'000 g/mol, 3'000 g/mol and 5'000 g/mol) and/or the [2-(methacryloyloxy)ethyl]trimethylammonium chloride (cationic monomer unit) was replaced by methacrylic acid (anionic monomer unit).

The following chapter gives an overview about the comb polymers produced and their properties.

1.5 Overview of Comb Polymers

TABLE 1

Comb polymers

| No. | Weight of MPEG-MA | Ionic monomer | Ratio |
|---|---|---|---|
| P1 | 1'000 g/mol | none | 0 |
| P2* | 1'000 g/mol | none | 0 |
| P3 | 1'000 g/mol | C | 2 |
| P4 | 2'000 g/mol | none | 0 |
| P5 | 1'000 g/mol | C | 0.2 |
| P6 | 2'000 g/mol | C | 0.2 |
| P7 | 500 g/mol | none | 0 |
| V1 | none | C | — |

MPEG-MA = methoxy polyethylene glycol methacrylate
C = [2-(methacryloyloxy)ethyl]trimethylammonium chloride
Ratio = number of ionic monomers/number of MPEG-MA monomers
*= Produced by conventional free radical polymerization

2. Mineral Binder Compositions

2.1 Mortar Mixtures

The mortar mixture used for test purposes had the dry composition described in Table 2:

TABLE 2

Dry composition of mortar mixture

| Component | Amount [g] |
|---|---|
| Cement (CEM I 42.5 N; Normo 4; available from Holcim Schweiz) | 750 g |
| Limestone filler | 141 g |
| Sand 0-1 mm | 738 g |
| Sand 1-4 mm | 1107 g |
| Sand 4-8 mm | 1154 g |
| Bentonite (swelling clay) | For proportions see results section |

To make a mortar mixture, the sands, the limestone filler, the cement and bentonite (if added) were dry-mixed in a Hobart mixer for 1 minute. Within 30 seconds, the mixing water (ratio of water to cement w/c=0.49) was added and the mixture was mixed for a further 2.5 minutes. The total wet mixing time was 3 minutes in each case.

Prior to the addition to the mortar mixture, the respective comb polymer (clay blocker) and plasticizer (Sika® ViscoCrete® 3082; available from Sika, Schweiz) were mixed into the mixing water (for proportions see results section). Sika® ViscoCrete® 3082 is a standard polycarboxylate ether-based superplasticizer corresponding to a polymer P as described above.

These mortar compositions are referred to as MC.

2.2 Cement Pastes

The cement pastes used for test purposes were based on 100 g cement (CEM I 42.5 N; Normo 4; available from Holcim Schweiz), 5 g limestone filler with a grain size below 0.125 mm, bentonite (for proportions see results section) and water.

To make a cement paste, the cement/filler/bentonite mix was added to a beaker and, in another beaker, the mixing water into which the respective comb polymer (clay blocker) and plasticizer (Sika® ViscoCrete® 3082; available form Sika, Schweiz) had been mixed beforehand (for proportions see results section), was added. Afterwards the cement/filler/bentonite mix was carefully poured into the beaker containing the water, and the wet mix was mixed for 1 minute with a propeller IKA stirrer at 1000 rpm. As a reference the water to cement ratio of the cement/filler paste including the PCE was adjusted to a flow of 10-12 cm.

These cement pastes are referred to as CP.

3. Testing Procedures

To determine the effectiveness of the clay-blocking comb polymers in the mortar mixture, the dispersing effect of the plasticizer was determined by measuring the flow table spread (ABM) of a series of mortar mixtures was measured in accordance with EN 1015-3 at different times.

The effectiveness of the clay-blocking comb polymers in the cement pastes was determined similarly. However, in this case a mini slump conus on a dry glass plate was used instead of the standard equipment defined in EN 1015-3.

The test for determining compressive strength (in MPa) was carried out on prisms (40×40×160 mm) in accordance with standard EN 12390-1 to 12390-4.

Also, the temperature curve of the mineral binder compositions (mortar mixtures, cement pastes) was recorded as control of hydration and setting behavior, respectively, after mixing. Thereby, the time to onset of the global temperature maximum was determined as a measure of the setting time.

The air content was measured according to EN 12350-7.

In the tests, all of the admixtures (clay blocker, plasticizer) have been added as aqueous solutions or dispersions with a content of active ingredients of 30 wt.-%. Bentonite was added as a powder.

4. Results

Table 3 gives an overview of a first series of tests conducted and the results achieved. Experiments $R^1$ to $R^5$ are experiments conducted for comparative purposes without the addition of a comb polymer according to the invention.

TABLE 3

(all wt.-% are given with respect to the cement content in the mineral binder composition)

| Components | Experiment | | | | | | | | | |
|---|---|---|---|---|---|---|---|---|---|---|
| | R1 | R2 | R3 | R4 | R5 | E1 | E2 | E3 | E4 | E5 |
| Mineral binder composition | MC | MC | MC | MC | MC | MC | MC | MC | MC | MC |
| Bentonite [wt. %] | 0 | 1 | 1 | 1 | 1 | 1 | 1 | 1 | 1 | 1 |
| Clay blocker | — | — | B1 | B2 | V1 | P1 | P3 | P4 | P5 | P6 |
| Proportion [wt.-%] | | | 0.3 | 0.3 | 0.3 | 0.3 | 0.3 | 0.3 | 0.3 | 0.3 |
| Plasticizer [wt.-%] | 0.5 | 0.5 | 0.5 | 0.5 | 0.5 | 0.5 | 0.5 | 0.5 | 0.5 | 0.5 |
| w/c | 0.44 | 0.44 | 0.44 | 0.44 | 0.44 | 0.44 | 0.44 | 0.44 | 0.44 | 0.44 |
| FTS# [mm] after | | | | | | | | | | |
| 0 min | 178 | 121 | 152 | 148 | 153 | 177 | 183 | 154 | 166 | 155 |
| 30 min | 151 | 115 | 137 | 145 | 135 | 157 | 167 | 142 | 145 | 140 |
| 60 min | 149 | 110 | 124 | 132 | 125 | 149 | 139 | 130 | 144 | 136 |
| Air content [%] | 3.5 | 3.2 | 3.3 | 2.9 | 2.3 | 2.5 | 3.5 | 3.1 | 3.2 | 3.0 |
| Setting time [h] | 12.3 | 10.5 | 12.3 | 11.3 | 11.7 | 12.2 | 11.2 | 10.8 | 11.0 | 10.5 |

Plasticizer = Sika ® ViscoCrete ® 3082
B1 = MasterSuna SBS 3890 (BASF)
B2 = Floerger Floquat FL 2250 (SNF sas, France)
= flow table spread according to EN 1015-3. The time "0 min" corresponds to the first measurement immediately after the mixing of the mortar sample.

The data in Table 3 clearly shows that the inventive comb polymers are highly effective clay blockers which are at least as effective as known clay blockers. Additionally, with the inventive comb polymers the clay-blocking activity can be maintained for a long time on a rather high level. Especially advantageous are the comb polymers P1 and P3, i.e. homopolymers of side chain-bearing monomers or block copolymers of side chain-bearing monomers with cationic monomers. Thereby, comb polymer P3 with cationic monomer units is the most effective.

Table 4 shows the results of a second set of experiments with comb polymers differing in side chain length.

TABLE 4

(all wt.-% are given with respect to the cement content in the mineral binder composition)

| Components | Experiment | | | | |
|---|---|---|---|---|---|
| | R6 | R7 | E6 | E7 | E8 |
| Mineral binder composition | MC | MC | MC | MC | MC |
| Bentonite [wt. %] | 0 | 1 | 1 | 1 | 1 |
| Clay blocker | — | — | P1 | P4 | P7 |
| Proportion [wt.-%] | | | 0.27 | 0.27 | 0.27 |
| Plasticizer [wt.-%] | 0.5 | 0.5 | 0.5 | 0.5 | 0.5 |
| w/c | 0.48 | 0.48 | 0.48 | 0.48 | 0.48 |
| FTS# [mm] after | | | | | |
| 0 min | 187 | 148 | 188 | 186 | 170 |
| 30 min | 173 | 137 | 173 | 167 | 155 |
| 60 min | 168 | — | 162 | 156 | 145 |
| Air content [%] | 2.4 | 2.4 | 2.6 | 2.5 | 2.6 |
| Setting time [h] | 16.0 | 13.3 | 13.2 | 12.8 | 15.3 |
| Strength [MPa] after | | | | | |
| 1 day | 19.3 | 20.0 | 18.3 | 19.8 | 19.0 |
| 28 days | 45.7 | 44.5 | 48.3 | 49.1 | 44.8 |

Plasticizer = Sika ® ViscoCrete ® 3082
= flow table spread according to EN 1015-3. The time "0 min" corresponds to the first measurement immediately after the making-up of the mortar sample.

As can be deduced from the results given in Table 4, comb polymers with a length of the side chains of at least 1'000 g/mol or higher are most efficient when compared with comb polymers having different chain lengths.

Table 5 shows the results of a third set of experiments in which comb polymers are compared to single MPEG side chain molecules.

TABLE 5

(all wt.-% are given with respect to the cement content in the mineral binder composition)

| | Experiment | | | | | |
|---|---|---|---|---|---|---|
| Components | R8 | R9 | R10 | R11 | R12 | E9 |
| Mineral binder composition | MC | MC | MC | MC | MC | MC |
| Bentonite [wt. %] | 0 | 1 | 1 | 1 | 1 | 1 |
| Clay blocker | — | — | B3 | B4 | B5 | P1 |
| Proportion [wt.-%] | | | 0.27 | 0.27 | 0.27 | 0.27 |
| Plasticizer [wt.-%] | 0.5 | 0.5 | 0.5 | 0.5 | 0.5 | 0.5 |
| w/c | 0.48 | 0.48 | 0.48 | 0.48 | 0.48 | 0.48 |
| FTS# [mm] after | | | | | | |
| 0 min | 190 | 151 | 156 | 163 | 177 | 184 |
| 30 min | 163 | 132 | 140 | 143 | 147 | 156 |
| 60 min | 153 | — | — | — | — | 152 |
| Air content [%] | 2.5 | 2.2 | 2.2 | 2.3 | 2.2 | 2.3 |
| Setting time [h] | 13.5 | 12.7 | 13.3 | 12.8 | 13.0 | 13.3 |
| Strength [MPa] after | | | | | | |
| 1 day | 22.1 | 21.6 | 21.7 | 22.0 | 21.2 | 22.5 |

Plasticizer = Sika ® ViscoCrete ® 3082
B3 = methoxy polyethylene glycol$_{1000}$ (average molecular weight: 1'000 g/mol)
B4 = methoxy polyethylene glycol$_{3000}$ (average molecular weight: 3'000 g/mol)
B5 = methoxy polyethylene glycol$_{5000}$ (average molecular weight: 5'000 g/mol)
= flow table spread according to EN 1015-3. The time "0 min" corresponds to the first measurement immediately after the making-up of the mortar sample.

As evident from Table 5, single MPEG side chains are less effective when compared with the inventive comb polymer P1.

Table 6 shows the results of a fourth set of experiments in which the dispersing effect of the inventive clay-blocking comb polymers is compared to a standard PCE in cement pastes without swelling clays.

TABLE 6

(all wt.-% are given with respect to the cement content in the mineral binder composition)

| | Experiment | | | |
|---|---|---|---|---|
| Components | R13 | R14 | E10 | E11 |
| Mineral binder composition | CP | CP | CP | CP |
| Bentonite [wt. %] | — | — | — | — |
| Clay blocker | — | — | P1 | P3 |
| Proportion [wt.-%] | | | 0.5 | 0.5 |
| Plasticizer [wt.-%] | — | 0.5 | — | — |
| w/c | 0.36 | 0.36 | 0.36 | 0.36 |
| FTS# [mm] after | | | | |
| 0 min | 65 | 113 | 67 | 67 |

Plasticizer = Sika ® ViscoCrete ® 3082
= flow table spread according to EN 1015-3 with mini slump conus (see above). The time "0 min" corresponds to the first measurement immediately after the mixing of the mortar sample.

Thus, the clay-blocking comb polymers according to the present invention do not have any significant plasticizing effect. Similar results have been obtained in mortar mixtures MC.

Table 7 shows the results of a fifth set of experiments whereby different clay blockers have been tested in mortar compositions with varying clay contents.

Thereby, all of the experiments VC1-VC14 have been performed with mortar mixture MC, a water to cement ratio (w/c) of 0.44, 0.5 wt. % plasticizer (Sika® ViscoCrete® 3082) and (if added) 0.25 wt. % of clay blocker as depicted in the second column of Table 7. In experiments VC13-VC14, the plasticizer has been omitted, so that only the water-reducing capability of P1 could be compared directly to B1 in the absence of clay.

TABLE 7

(all wt.-% are given with respect to the cement content in the mineral binder composition)

| Experiment | Clay blocker | Bentonite [wt. %] | FTS# [mm] after 0 min. | FTS increase@ |
|---|---|---|---|---|
| VC1 | — | 1.00 | 148 | +29.7% |
| VC2 | | 0.66 | 160 | |
| VC3 | | 0.33 | 178 | |
| VC4 | | — | 192 | |
| VC5 | B1 | 1.00 | 190 | +30.5% |
| VC6 | | 0.66 | 220 | |
| VC7 | | 0.33 | 244 | |
| VC8 | | — | 248 (bleeding observed) | |
| VC9 | P1 | 1.00 | 190 | +11.6% |
| VC10 | | 0.66 | 198 | |
| VC12 | | 0.33 | 209 | |
| VC12 | | — | 212 | |
| VC13+ | P1 | — | 133 | |
| VC14+ | B1 | — | 222 | |

B1 = MasterSuna SBS 3890 (BASF)
= flow table spread according to EN 1015-3. The time "0 min" corresponds to the first measurement immediately after the making-up of the mortar sample.
@= relative increase of FTS with respect to FTS with 1 wt. % Bentonite for a given clay blocker
+= without plasticizer The data given in Table 7 show that the inventive comb polymers are highly robust, i.e. the sensitivity to varying swelling clay contents is rather low.

Specifically, when decreasing the clay content from 1 wt. % to 0 wt. %, with the inventive comb polymer P1 as clay blocker, the FTS increases only by 11.6%. With all of the other tested clay blocker B1, the increase in FTS is >30% and, thus, much higher in this range of swelling clay contents. The much stronger increase of B1 (experiment VC14) can be explained by the significant stronger plasticizing effect of B1 itself (experiment VC14) compared to the inventive comb polymer P1 (experiment VC13).

Table 8 compares the effectiveness of the inventive comb polymer P1, which was produced via a controlled free radical polymerization, and the inventive comb polymer P2, which was produced via conventional free-radical polymerization.

TABLE 8

(all wt.-% are given with respect to the cement content in the mineral binder composition)

| Components | Experiment | | | |
|---|---|---|---|---|
| | R15 | R16 | E12 | E13 |
| Mineral binder composition | MC | MC | MC | MC |
| Bentonite [wt. %] | 0 | 1 | 1 | 1 |
| Clay blocker | — | — | P1 | P2 |
| Proportion [wt.-%] | | | 0.27 | 0.27 |
| Plasticizer [wt.-%] | 0.5 | 0.5 | 0.5 | 0.5 |
| w/c | 0.48 | 0.48 | 0.48 | 0.48 |
| FTS# [mm] after | | | | |
| 0 min | 190 | 151 | 184 | 188 |
| 30 min | 163 | 132 | 156 | 152 |
| 60 min | 153 | — | 152 | 147 |
| Air content [%] | 2.5 | 2.2 | 2.3 | 2.4 |
| Setting time [h] | 13.5 | 12.7 | 13.3 | 12.5 |
| Strength [MPa] after | | | | |
| 1 day | 22.1 | 21.6 | 22.5 | 22.1 |

Plasticizer = Sika ® ViscoCrete ® 3082
= flow table spread according to EN 1015-3. The time "0 min" corresponds to the first measurement immediately after the making-up of the mortar sample.

It is evident that both inventive polymers P1 and P2 having a similar side chain length of 1'000 g/mol show a similar clay-blocking effectiveness, although they were produced with different polymerization processes.

It will be appreciated by those skilled in the art that the present invention can be embodied in other specific forms without departing from the spirit or essential characteristics thereof. The presently disclosed embodiments are therefore considered in all respects to be illustrative and not restricting.

The invention claimed is:

1. A method for inerting a swellable clay and/or for reducing or inhibiting adverse effects of swellable clays on the effectiveness of dispersants in mineral binder compositions, comprising adding a comb polymer to a mineral binder composition,
    wherein the comb polymer comprises:
        at least one poly(alkylene oxide) side chain-bearing monomer unit M1 without ionic groups,
        optionally at least one anionic monomer unit MA,
        optionally, at least one non-ionic monomer unit M3,
    wherein the comb polymer, with respect to a total number of monomer units present in the comb polymer, comprises:
        98-100 mol-%, of the at least one poly(alkylene oxide) side chain-bearing monomer unit M1,
        0 mol-%, of a cationic monomer unit MC,
        0-1 mol-%, of the at least one anionic monomer unit MA, and
        0-1 mol-%, of the at least one non-ionic monomer unit M3, and
    wherein the side chain-bearing monomer unit M1 includes a structure of formula I

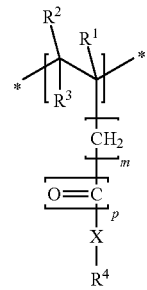

(I)

wherein
$R^1$, and $R^2$, in each case independently, are H or an alkyl group having 1 to 5 carbon atoms,
$R^3$, in each case independently, is H, an alkyl group having 1 to 5 carbon atoms, or a group with formula

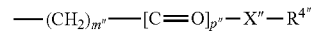

m and m''=0, 1 or 2,
p and p''=0,
X and X'', in each case independently, is —O— or —NH—,
$R^4$ and $R^{4''}$ is a group of the formula -[AO]$_n$—$R^a$
where A is a $C_2$- to $C_4$-alkylene, $R^a$ is H, a $C_1$- to $C_{20}$-alkyl group, -cycloalkyl group or -alkylaryl group,
and n=2-250.

2. The method according to claim 1,
    wherein the comb polymer consists of:
        at least one poly(alkylene oxide) side chain-bearing monomer unit M1 without ionic groups,
        optionally at least one anionic monomer unit MA,
        optionally, at least one non-ionic monomer unit M3,
    wherein the comb polymer, with respect to a total number of monomer units present in the comb polymer, consists of:
        98-100 mol-%, of the at least one poly(alkylene oxide) side chain-bearing monomer unit M1,
        0 mol-%, of a cationic monomer unit MC,
        0-1 mol-%, of the at least one anionic monomer unit MA, and
        0-1 mol-%, of the at least one non-ionic monomer unit M3, and
    wherein the side chain-bearing monomer unit M1 includes a structure of formula I

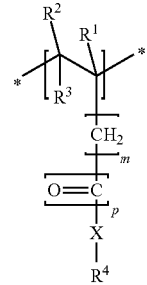

(I)

wherein
R$^1$, and R$^2$, in each case independently, are H or an alkyl group having 1 to 5 carbon atoms,
R$^3$, in each case independently, is H, an alkyl group having 1 to 5 carbon atoms, or a group with formula 5

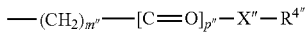

m and m"=0, 1 or 2,
p and p"=0,
X and X", in each case independently, is —O— or —NH—,
R$^4$ and R$^{4"}$ is a group of the formula -[AO]$_n$—R$^a$ where A is a C$_2$- to C$_4$-alkylene, R$^a$ is H, a C$_1$- to C$_{20}$-alkyl group, -cycloalkyl group or alkylaryl group,
and n=2-250.

3. The method according to claim 2, wherein the comb polymer consists of the at least one poly(alkylene oxide) side chain-bearing monomer unit M1 without ionic groups, and the comb polymer, with respect to a total number of monomer units present in the comb polymer, comprises 100 mol-% of the at least one poly(alkylene oxide) side chain-bearing monomer unit M1.

4. The method according to claim 1, wherein the anionic monomer unit MA in the polymer consists of a monomer which has a structure of formula III,

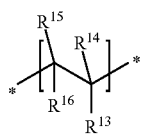

(III)

wherein
R$^{13}$, in each case independently, is —COOM, —SO$_2$—OM, —O—PO(OM)$_2$ and/or —PO(OM)$_2$,
R$^{14}$ and R$^{15}$, in each case independently, are H or an alkyl group having 1 to 5 carbon atoms,
R$^{16}$, in each case independently, are H, —COOM or an alkyl group having 1 to 5 carbon atoms,
or where R$^{13}$ forms a ring together with R$^{16}$ to give —CO—O—CO—,
M independently from each other is H$^+$, an alkali metal ion, an alkaline earth metal ion, a di- or trivalent metal ion, an ammonium ion and an organic ammonium group.

5. The method according to claim 1, wherein the nonionic monomer M3 has a structure of formula IV,

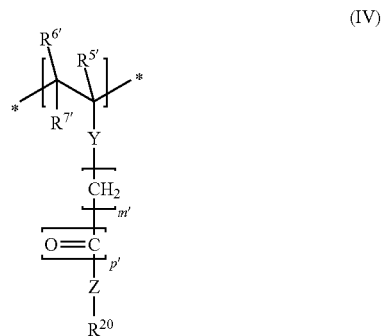

(IV)

wherein
R$^{5'}$, R$^{6'}$, R$^{7'}$, in each case independently, are H or an alkyl group having 1 to 5 carbon atoms,
m'=0, 1 or 2,
p'=0 or 1,
Y, in each case independently, is a chemical bond or —O—,
Z, in each case independently, is a chemical bond, —O— or —NH—,
R$^{20}$, in each case independently, is an alkyl group, cycloalkyl group, alkylaryl group, aryl group, hydroxyalkyl group or acetoxyalkyl group, each having 1-20 carbon atoms.

* * * * *